(12) United States Patent
Goel et al.

(10) Patent No.: US 8,775,347 B2
(45) Date of Patent: Jul. 8, 2014

(54) MARKOV DECISION PROCESS-BASED SUPPORT TOOL FOR RESERVOIR DEVELOPMENT PLANNING

(75) Inventors: Vikas Goel, Houston, TX (US); Kevin C. Furman, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 625 days.

(21) Appl. No.: 12/864,971

(22) PCT Filed: Jan. 30, 2009

(86) PCT No.: PCT/US2009/032736
§ 371 (c)(1),
(2), (4) Date: Jul. 28, 2010

(87) PCT Pub. No.: WO2009/128972
PCT Pub. Date: Oct. 22, 2009

(65) Prior Publication Data
US 2010/0325075 A1    Dec. 23, 2010

Related U.S. Application Data
(60) Provisional application No. 61/124,681, filed on Apr. 18, 2008.

(51) Int. Cl.
*G06F 17/00* (2006.01)
(52) U.S. Cl.
USPC ................................ 706/46; 703/10; 702/13
(58) Field of Classification Search
USPC .......................................................... 703/10
See application file for complete search history.

(56) References Cited

U.S. PATENT DOCUMENTS 5,729,451 A    3/1998   Gibbs et al.
5,764,515 A    6/1998   Guerillot et al.
(Continued)

FOREIGN PATENT DOCUMENTS

CA    2 529 339    12/2004
EP    1 865 340    12/2007
(Continued)

OTHER PUBLICATIONS

L. Saputelli, M. Nikolaou, M. J. Economides. Real-time reservoir management: A multiscale adaptive optimization and control approach. Computational Geosciences. Mar. 2006, vol. 10, Issue 1, pp. 61-96.*

(Continued)

*Primary Examiner* — Li-Wu Chang
*Assistant Examiner* — David H Kim
(74) *Attorney, Agent, or Firm* — ExxonMobil Upstream Research Company, Law Dept.

(57) ABSTRACT

A Markov decision process-based support tool for reservoir development planning can comprise a source of input data, an optimization model, a high fidelity model for simulating the reservoir, and one or more solution routines interfacing with the optimization model. The optimization model can consider unknown parameters having uncertainties directly within the optimization model. The model incorporates the flexibility that a decision-maker has in the real world and allows the decision-maker to adjust the decisions based on new information. The model can systematically address uncertain data, for example comprehensively or even taking all uncertain data into account. Accordingly, the optimization model can provide flexible or robust solutions that remain feasible over an uncertainty space. Once the reservoir model is optimized, final development plans may be generated.

24 Claims, 7 Drawing Sheets

(56) References Cited

U.S. PATENT DOCUMENTS

| | | | |
|---|---|---|---|
| 5,798,982 A | 8/1998 | He et al. | |
| 5,878,372 A | 3/1999 | Tabarovsky et al. | |
| 6,067,340 A | 5/2000 | Eppstein et al. | |
| 6,128,577 A | 10/2000 | Assa et al. | |
| 6,216,083 B1 | 4/2001 | Ulyanov et al. | |
| 6,230,101 B1 | 5/2001 | Wallis | |
| 6,246,963 B1 | 6/2001 | Cross et al. | |
| 6,381,505 B1 | 4/2002 | Kassmann et al. | |
| 6,522,973 B1 | 2/2003 | Tonellot et al. | |
| 6,609,060 B2 | 8/2003 | Ulyanov et al. | |
| 6,618,695 B1 | 9/2003 | Hu et al. | |
| 6,662,109 B2 | 12/2003 | Roggero et al. | |
| 6,674,432 B2 | 1/2004 | Kennon et al. | |
| 6,721,718 B2 | 4/2004 | Ulyanov | |
| 6,775,578 B2 | 8/2004 | Couet et al. | |
| 6,813,565 B1 | 11/2004 | Hu et al. | |
| 6,823,297 B2 | 11/2004 | Jenny et al. | |
| 6,826,483 B1 | 11/2004 | Anderson et al. | |
| 6,826,486 B1 | 11/2004 | Malinverno | |
| 6,907,392 B2 | 6/2005 | Bennis et al. | |
| 6,912,491 B1 | 6/2005 | Van Bemmel | |
| 6,941,255 B2 | 9/2005 | Kennon et al. | |
| 6,980,940 B1 | 12/2005 | Gurpinar et al. | |
| 7,006,951 B2 | 2/2006 | Pond, Jr. et al. | |
| 7,027,964 B2 | 4/2006 | Kennon | |
| 7,043,413 B2 | 5/2006 | Ward et al. | |
| 7,047,165 B2 | 5/2006 | Balaven et al. | |
| 7,054,752 B2 | 5/2006 | Zabalza-Mezghani et al. | |
| 7,096,122 B2 | 8/2006 | Han | |
| 7,096,172 B2 | 8/2006 | Colvin et al. | |
| 7,149,671 B2 | 12/2006 | Lim et al. | |
| 7,200,533 B2 | 4/2007 | Hu et al. | |
| 7,200,540 B2 | 4/2007 | Colvin et al. | |
| 7,254,091 B1 | 8/2007 | Gunning et al. | |
| 7,260,508 B2 | 8/2007 | Lim et al. | |
| 7,277,806 B2 | 10/2007 | Lu et al. | |
| 7,310,579 B2 | 12/2007 | Ricard et al. | |
| 7,369,973 B2 | 5/2008 | Kennon et al. | |
| 7,392,166 B2 | 6/2008 | Le Ravalec-Dupin et al. | |
| 7,426,460 B2 | 9/2008 | Noetinger et al. | |
| 7,430,501 B2 | 9/2008 | Feraille et al. | |
| 7,451,066 B2 | 11/2008 | Edwards et al. | |
| 7,478,024 B2 | 1/2009 | Gurpinar et al. | |
| 7,496,488 B2 | 2/2009 | Jenny et al. | |
| 7,546,228 B2 | 6/2009 | Cullick et al. | |
| 7,546,229 B2 | 6/2009 | Jenny et al. | |
| 7,558,715 B2 | 7/2009 | Schaaf et al. | |
| 7,577,061 B2 | 8/2009 | Williamson et al. | |
| 7,584,081 B2 | 9/2009 | Wen et al. | |
| 2002/0042702 A1 | 4/2002 | Calvert et al. | |
| 2002/0133958 A1* | 9/2002 | Noureldin et al. | 33/304 |
| 2003/0093392 A1 | 5/2003 | Ulyanov | |
| 2003/0225606 A1 | 12/2003 | Raghuraman et al. | |
| 2004/0220790 A1 | 11/2004 | Cullick et al. | |
| 2005/0010383 A1 | 1/2005 | Le Ravalec-Dupin et al. | |
| 2005/0015226 A1 | 1/2005 | Le Ravalec-Dupin et al. | |
| 2005/0096893 A1 | 5/2005 | Feraille et al. | |
| 2005/0120195 A1 | 6/2005 | Kumar | |
| 2005/0192855 A1 | 9/2005 | Chitty et al. | |
| 2006/0047489 A1 | 3/2006 | Scheidt et al. | |
| 2006/0241925 A1 | 10/2006 | Schaaf et al. | |
| 2006/0247990 A1 | 11/2006 | Narayanan et al. | |
| 2007/0073527 A1 | 3/2007 | Flandrin et al. | |
| 2007/0094187 A1 | 4/2007 | Anderson et al. | |
| 2007/0094216 A1 | 4/2007 | Mathias et al. | |
| 2007/0156377 A1 | 7/2007 | Gurpinar et al. | |
| 2007/0179766 A1 | 8/2007 | Cullick et al. | |
| 2007/0226158 A1* | 9/2007 | Woronow et al. | 706/17 |
| 2007/0265815 A1 | 11/2007 | Couet et al. | |
| 2007/0294034 A1 | 12/2007 | Bratton et al. | |
| 2008/0077371 A1 | 3/2008 | Yeten et al. | |
| 2008/0091353 A1 | 4/2008 | Krumhansl et al. | |
| 2008/0167849 A1 | 7/2008 | Hales et al. | |
| 2008/0288226 A1 | 11/2008 | Gurpinar et al. | |
| 2008/0288336 A1 | 11/2008 | Gurpinar et al. | |
| 2009/0006057 A1 | 1/2009 | Niu et al. | |
| 2009/0125288 A1* | 5/2009 | Main et al. | 703/10 |
| 2009/0164187 A1 | 6/2009 | Habashy et al. | |
| 2009/0164188 A1 | 6/2009 | Habashy et al. | |
| 2009/0234625 A1 | 9/2009 | Zangl et al. | |
| 2009/0306866 A1* | 12/2009 | Malikopoulos | 701/59 |
| 2010/0185422 A1* | 7/2010 | Hoversten | 703/2 |
| 2011/0172976 A1* | 7/2011 | Budiman et al. | 703/2 |

FOREIGN PATENT DOCUMENTS

| | | |
|---|---|---|
| WO | WO 01/55939 | 8/2001 |
| WO | WO 01/62603 | 8/2001 |
| WO | WO 2006/119099 | 11/2006 |
| WO | WO 2007/058662 | 5/2007 |
| WO | WO 2009/128972 | 10/2009 |
| WO | WO 2009/131761 | 10/2009 |
| WO | WO 2009/145960 | 12/2009 |

OTHER PUBLICATIONS

Goel, Vikas, and Ignacio E. Grossmann. "A class of stochastic programs with decision dependent uncertainty." Mathematical programming 108.2 (2006): 355-394.*

Goel and Grossmann. A stochastic programming approach to planning of offshore gas field developments under uncertainty in reserves. Computers and Chemical Engineering 28 (2004) 1409-1429.*

Atamtürk, A. (2007), "Strong Formulations of Robust Mixed 0-1 Programming", Mathematical Programming, v108, pp. 235-250.

Bellman, R. (1957), "A Markovian Decision Process," *Journal of Mathematics and Mechanics* 6, pp. 679-684.

Ben-Tal, A. et al. (1999), "Robust Solutions to Uncertain Linear Programs", Operations Research Letter, v25, pp. 1-13.

Ben-Tal, A. et al. (1998), "Robust Convex Optimization", Mathematics of Operations Research, v23, n4, pp. 769-805.

Ben-Tal, A. et al. (2002), "Robust Optimization—Methology and Applications", Mathematical Programming, v92, pp. 453-480.

Bertsimas, D. et al. (2004), "The Price of Robustness", Oper. Res., v52, n1, pp. 35-53.

Mezzomo, C.C. et al., "Field Development Planning Optimization Using Reservoir Simulation", Universidade Estadual de Campinas, 8 pgs.

Ordonez, F. (2004), "Lecture 1: Introduction to Robust Optimization", http://ww-ref.usc/edu/fordon/robopt04/, 9 pgs.

Robust Optimization, http:/en.wikipedia.org/wiki/Robust_optimization, 4 pages.

Bittencourt, A.C., et al., (1997) "Reservoir Development and Design Optimization", SPE Annual Technical Conference and Exhibition, Oct. 5, 1997, San Antonia, TX, *SPE* 38895, pp. 1-14.

Mousavi, S. J., et al (2004) "A Stochastic Dynamic Programming Model With Fuzzy Storage States For Reservoir Operations", *Advances in Water Resources* V27, Issue 11, pp. 1105-1110.

U.S. Appl. No. 61/124,500, filed Apr. 17, 2008, Furman et al.

U.S. Appl. No. 61/124,681, filed Apr. 18, 2008, Goel et al.

U.S. Appl. No. 61/124,929, filed Apr. 21, 2008, Goel et al.

Haugen, K.K. (1996), "A stochastic dynamic programming model for scheduling of offshore petroleum fields with resource uncertainty," *European Journal of Operational Research* 88(1), pp. 88-100.

Mezzomo, C.C. et al., "Field Development Planning Optimization Using Reservoir Simulation", Universidade Estadual de Campinas, 8 pgs. SMRS, 2002.

Ordonez, F. (2004), "Lecture 1: Introduction to Robust Optimization", http://ww-ref.use/edu/fordon/robopt04/, 9 pgs.

Sweet, M.L. et al. (2007), Genesis field, Gulf of Mexico: Recognizing reservoir compartments on geologic and production time scales in deep-water reservoirs, *AAPG Bulletin* 91(12), pp. 1701-1729.

van Essen, G.M. et al. (2006), "Robust Waterflooding Optimization of Multiple Geological Scenarios", SPE 102913, 2006 SPE Annual Tech. Conf. & Exh., San Antonio, TX, Sep. 24-27, 2006, 7 pgs.

van Essen, G.M. et al. (2006), "Robust Optimization of Oil Reservoir Flooding", Control Applications, 1 pg.

White, D.J. (1993), "A Survey of Applications of Markov Decision Processes," *Jounral of Operational Research Society* 44(11), pp. 1073-1096.

(56) References Cited

OTHER PUBLICATIONS

Zandvliet, M. (2004), "Control in reservoir engineering under model uncertainty", Dept. of Geotechnology, Section Petroleum Engineering (Smart Wells group), 2 pgs.

Zhang, Y. (2007), "General Robust-Optimization Formulation for Nonlinear Programming", *J. of Optimization Theory and Applns.* 132(1), pp. 111-124.

*European Search Report*, dated Dec. 29, 2008, EP Application No. 08159867.4.

*International Search Report and Written Opinion*, dated Apr. 22, 2009, PCT/US2009/036540.

*International Search Report and Written Opinion*, dated Mar. 23, 2009, PCT/US2009/032736.

*International Search Report and Written Opinion*, dated May 4, 2009, PCT/US2009/036536.

\* cited by examiner

MARKOV DECISION PROCESS-BASED SUPPORT TOOL FOR RESERVOIR DEVELOPMENT PLANNING

CROSS-REFERENCE TO RELATED APPLICATION

This application is the National Stage of International Application No. PCT/US2009/032736, that published as WO 2009/128972, filed 30 Jan. 2009, which claims the benefit of U.S. Provisional Application No. 61/124,681, filed 18 Apr. 2008, each of which is incorporated herein by reference, in its entirety, for all purposes.

TECHNICAL FIELD

This description relates generally to oil and gas production, and more particularly to reservoir development planning that takes uncertainty into consideration.

BACKGROUND

Developing and managing petroleum resources often entails committing large economic investments over many years with an expectation of receiving correspondingly large financial returns. Whether a petroleum reservoir yields profit or loss depends largely upon the strategies and tactics implemented for reservoir development and management. Reservoir development planning involves devising and/or selecting strong strategies and tactics that will yield favorable economic results over the long term.

Reservoir development planning may include making decisions regarding size, timing, and location of production platforms as well as subsequent expansions and connections, for example. Key decisions can involve the number, location, allocation to platforms, and timing of wells to be drilled and completed in each field. Post drilling decisions may include determining production rate allocations across multiple wells. Any one decision or action may have system-wide implications, for example propagating positive or negative impact across a petroleum operation or a reservoir. In view of the aforementioned aspects of reservoir development planning, which are only a representative few of the many decisions facing a manager of petroleum resources, one can appreciate the value and impact of planning.

Computer-based modeling holds significant potential for reservoir development planning, particularly when combined with advanced mathematical techniques. Computer-based planning tools support making good decisions. One type of planning tool includes methodology for identifying an optimal solution to a set of decisions based on processing various information inputs. For example, an exemplary optimization model may work towards finding solutions that yield the best outcome from known possibilities with a defined set of constraints. Accordingly, a petroleum operation may achieve great economic benefit via properly applying optimization models for optimizing the development plans and management of petroleum resources, particularly those involving decision-making for multiple oil or gas fields over a multiple years.

The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms can describe working towards a solution which may be the best available solution, a preferred solution, or a solution that offers a specific benefit within a range of constraints; or continually improving; or refining; or searching for a high point or a maximum for an objective; or processing to reduce a penalty function; etc.

In certain exemplary embodiments, an optimization model can be an algebraic system of functions and equations comprising (1) decision variables of either continuous or integer variety which may be limited to specific domain ranges, (2) constraint equations, which are based on input data (parameters) and the decision variables, that restrict activity of the variables within a specified set of conditions that define feasibility of the optimization problem being addressed, and/or (3) an objective function based on input data (parameters) and the decision variables being optimized, either by maximizing the objective function or minimizing the objective function. In some variations, optimization models may include non-differentiable, black-box and other non-algebraic functions or equations.

A typical (deterministic) mathematical optimization problem involves minimization or maximization of some objective function subject to a set of constraints on problem variables. These problems can often be formulated as a Dynamic Programming (DP) problem. In a DP problem, the decision time horizon is partitioned into a set of "stages" and the system exists in one of several "states." It may be helpful visualizing the DP problem as an X-Y coordinate system, where the x-axis is represented by the "stages" and the y-axis is represented by the "states." At each "stage", the decision-maker takes an "action" or decision, which results in the system transitioning from one state at one stage to a different state in the next stage. In one type of DP problem, the objective function can be minimized to determine the total cost or maximized to determine the total revenue over the entire planning horizon. Before the system transitions, a cost/revenue is incurred at each stage based upon the chosen decision and on the current state. It is assumed that the cost function is separable across stages and that the system is Markovian; i.e., the state to which the system transitions in stage n+1 depends only on its state in stage n and the action taken in stage n.

A dynamic program can be represented as (S, A, R) where S is the state space, A(s) is the set of actions that can be taken in state s, and R(s,a) is the reward for choosing action a in state s. The dynamic program is formulated as a recursive optimization problem as shown below:

1. $J_n^*(s) = \min_a [c(s, a) + J_{n+1}^*(f(s, a))]$ for $n = 1, 2, 3, \ldots N$ 2. Where 3. $J_n^*(s)$ = optimal cost-to-go function in stage $n$ given state $s$ 4. $c(s, a)$ = cost of choosing action $a$ in state $s$ 5. $f(s, a)$ = transition function that determines state in stage $n + 1$ given that system is in state $s$ in stage $n$ and action $a$ is chosen.

The final reward, $J_N^*(s)$, is assumed to be known. The goal of the dynamic program is to find $J_o^*(s_o)$ where $s_o$ is the initial state of the system. Dynamic programs may be solved using backward recursion when the time horizon is finite. However, when the time horizon is infinite, dynamic programs may be solved using algorithms such as value/policy iteration.

Solving the problem to mathematical optimality can comprise finding values for the decision variables such that all constraints are satisfied, wherein it is essentially mathematically impossible to improve upon the value of the objective function by changing variable values while still remaining feasible with respect to all of the constraints. When some of the "known" fixed parameters of the problem are actually uncertain in practice, a common approach in decision-making is to ignore the uncertainty and model the problem as a deterministic optimization problem. However, the solution to the deterministic optimization problem may be sub-optimal, or possibly even infeasible, especially if the problem parameters take values that are ultimately different than those values chosen to be used as input into the optimization model that is solved.

The optimization process of reservoir development planning can be challenging, even under the assumption that the economics and behavior of reservoir and surface facilities are fully known. Typically, a large number of soft and hard constraints apply to an even larger number of decision variables. In practice, however, there exists uncertainty in reservoir behavior, economics, and/or other components of the decision process, which complicate the optimization process.

SUMMARY

Conventional reservoir development planning technologies generally fail to consider such uncertainty adequately. Uncertainty is ordinarily inherent in the information and factors pertinent to development planning. That is, the inputs to the optimization problem (and perhaps the mathematical modeling of the problem) contain uncertainty. Uncertainty can be viewed as characteristics or aspects that are nondeterministic or that otherwise remain unknown, a priori. Conventional approaches for applying computer programming for decision support in developing and managing petroleum resources do not take a sufficiently comprehensive view of such uncertainty.

Currently, considerations for uncertainty in reservoir behavior, economics, or other components of the decision process are typically reduced to a very limited number of cases, for example represented by a "high-side" case, a "most-likely" case, and a "low-side" case. For instance, the uncertainty in reservoir behavior is reduced to a known value, for each of the three cases mentioned above, by typically sampling random points within the uncertainty space. The term "uncertainty space," as used herein, generally refers to a representation of uncertainty relevant to a problem that is under solution, for example the collective uncertainties for data input to an optimization routine.

Based upon limited sampling of the uncertainty space, a value is assigned to the "high-side" case, the "most-likely" case, and the "low-side" case. Decisions are usually optimized for a specific case, usually the "most-likely" case, and subsequently evaluated for the remaining two cases to provide an acceptable level of risk. This approach, however, grossly underestimates the complexity of the uncertainty and can lead to a solution that is sub-optimal or that is less favorable than some other unidentified solution.

In view of the foregoing discussion, need is apparent in the art for an improved tool that can aid reservoir development planning and/or that can provide decision support in connection with reservoir development and resource management. A need further exists for a tool that can take a broad range of uncertainties into consideration for the plans or decision support. A need further exists for a tool that systematically addresses uncertain data within a model used to produce plans or decision support. A need further exists for a tool that can handle a full uncertainty space in connection with producing reservoir development plans or decision support. A need further exists for a tool in which inherent uncertainty in data is incorporated directly into the decision optimization model, so tradeoffs associated with decisions across various realizations of the uncertainty are captured and hence better information is available when making decisions regarding petroleum and/or natural gas reservoir development planning. The foregoing discussion of need in the art is intended to be representative rather than exhaustive. A technology addressing one or more such needs, or some other related shortcoming in the field, would benefit reservoir development planning, for example providing decisions or plans for developing and managing a reservoir more effectively and more profitably.

The present invention supports making decisions, plans, strategies, and/or tactics for developing and managing petroleum resources, such as a petroleum reservoir.

In one aspect of the present invention, a computer- or software-based method can provide decision support in connection with developing one or more petroleum reservoirs. For example, the method can produce a reservoir development plan based on input data relevant to the reservoir and/or to the operation. Such input data can comprise, unknown or ill-defined fluid dynamics, the size of the reservoir, the current state of development, current and projected prices of petroleum, drilling costs, cost per hour of rig time, geological data, the cost of capital, current and projected available resources (human, financial, equipment, etc.), and the regulatory environment, to name a few representative possibilities. The input data can have uncertainty. More specifically, each element of input data can have an associated level, amount, or indication of uncertainty. Some of the input data may be known with a high level of uncertainty, such as the current cost of rig time, while other input data may have various degrees of uncertainty. For example, uncertainty of future rig time cost may increase as the amount of time projected into the future increases. That is, the uncertainty of rig time cost for the fifth year of the development plan would likely be higher than the uncertainty of rig time cost for the second year. The collective uncertainties of the input data can define an uncertainty space. A software routine can produce the reservoir development plan via processing the input data and taking the uncertainty space into consideration, for example via applying a Markov decision process-based routine. Producing the reservoir development plan can comprise outputting some aspect of a plan, making a determination relevant to generating or changing a plan, or making a recommendation about one or more decisions relevant to reservoir development or management, for example.

In one general aspect, a method for reservoir development planning includes receiving data relevant to reservoir development. The received data is processed via a computer-implemented Markov decision process-based model. A reservoir development plan is generated in response to processing the received data via a computer-implemented Markov decision process-based model.

Implementations of this aspect may include one or more of the following features. For example, the reservoir development plan may be generated according to an uncertainty space associated with the received data. The computer-implemented Markov decision process-based model may include optimizing at least some aspect of the reservoir development plan based on the received data and an uncertainty space. Receiving data may include receiving known data parameters and uncertain data parameters. Processing the received data via the computer-implemented Markov decision process-based model may include processing the data with a Markov decision process-based model that incorporates the uncertain data parameters. An uncertainty space may be associated with the received data. Processing the received data via the computer-implemented Markov decision process-based model may include considering the uncertainty space in entirety. The Markov decision process-based model may include a plurality of stages, each state representing a discrete step in time, a plurality of states in each stage, each state representing a potential state of the reservoir development plan, and/or a plurality of transition probabilities. Each transition probability represents an uncertainty in the data, and each transition probability is determined by the current state of the reservoir development plan and a decision to be taken. A future state is determined from the transition probability. A decision-maker is allowed to undertake one or more corrective decisions at each of the plurality of stages within the Markov decision process-based model.

In another general aspect, a method for reservoir development planning includes receiving data relevant to reservoir development planning, wherein uncertainty is associated with the data. At least some portion of a reservoir development plan is produced in response to processing the received data with a computer-based optimization model that incorporates the uncertainty. One or more corrective decisions are undertaken as the uncertainty unfolds over time.

Implementations of this aspect may include one or more of the following features. For example, the computer-based optimization model may be a Markov decision process-based model. The uncertainty may be incorporated in the Markov decision process-based model by capturing tradeoffs across a plurality of realizations of the uncertainty. Producing at least some portion of the reservoir development plan in response to processing the received data with the computer-based optimization model that incorporates the uncertainty may include achieving feasibility of an optimization problem across an entire uncertainty space. Producing at least some portion of the reservoir development plan in response to processing the received data with the computer-based optimization model that incorporates the uncertainty may include systemically processing uncertain data within the Markov decision process-based model.

In another general aspect, a method for decision support regarding development of petroleum resources includes receiving a plurality of data elements regarding a decision about developing a petroleum reservoir, wherein a respective characterization of uncertainty is associated with each of the data elements. A recommendation for the decision is output in response to processing each of the data elements and each of the respective characterizations of uncertainty with a computer-based Markov decision process-based model. The Markov decision process-based model incorporates each of the respective characterizations of uncertainty. Processing each of the data elements and each of the respective characterizations of uncertainty with the computer-based Markov decision process-based model may include covering an uncertainty space.

In another general aspect, a computer-based method of optimizing development planning for a reservoir includes providing input data that comprises uncertainty. A first simulation of the reservoir is generated using a high fidelity model for reservoir or surface facility behavior utilizing the input data, wherein the first simulation generates first high fidelity output data. A low fidelity model is generated for reservoir or surface facility behavior using the input data and the first high fidelity output data, wherein the low fidelity model generates a prediction. A reservoir development planning model is optimized utilizing the input data and the low fidelity model for reservoir or surface facility behavior, wherein the reservoir development planning model generates reservoir development planning output data. The reservoir development planning model includes a Markov decision process-based model. A second simulation of the reservoir is performed using the high fidelity model for reservoir or surface facility behavior utilizing the input data and the reservoir development planning output data, wherein the second simulation generates second high fidelity output data. The second high fidelity output data is compared with the prediction of the low fidelity model. The steps of generating a low fidelity model for reservoir or surface facility behavior, optimizing a reservoir development planning model, performing a second simulation of the reservoir using the high fidelity model for reservoir or surface facility behavior, and comparing the second high fidelity output data with the prediction of the low fidelity model are repeated until the second high fidelity output data is substantially consistent with the prediction of the low fidelity model.

Implementations of this aspect may include one or more of the following features. For example, a development plan may be generated in response to the second high fidelity output data being substantially consistent with the prediction of the low fidelity model. A solution routine, interfacing with the Markov decision process-based model, may assist the Markov decision process-based model to optimize development planning for the reservoir. The Markov decision process-based model may include a solution routine for assisting with optimizing development planning for the reservoir.

In another general aspect, a method of producing hydrocarbons from a subterranean reservoir includes generating a reservoir development planning system based on input data. The reservoir development planning system is optimized according to an uncertainty space, wherein the reservoir development planning system is optimized using a Markov decision process-based model. Hydrocarbons are produced from the reservoir according to output from the optimized reservoir development planning system. The input data may include deterministic components and nondeterministic components. Optimizing the reservoir development planning system according to the uncertainty space may include considering each of the nondeterministic components with the Markov decision process-based model. The Markov decision process-based model may incorporate uncertainty of the input data. The uncertainty space may specify inherent uncertainty of the input data. The reservoir development planning system may include a Markov decision process-based model comprising a low fidelity reservoir model, and a high fidelity reservoir model. The high fidelity model may accept one or more parameter input data from the Markov decision process-based model and provides one or more reservoir or surface facility property input data to the Markov decision process-based model. The reservoir development planning system may be optimized by simulating operation of the reservoir using a high fidelity model; and simulating operation of the reservoir using a low fidelity model.

The discussion of decision support tools for reservoir development presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
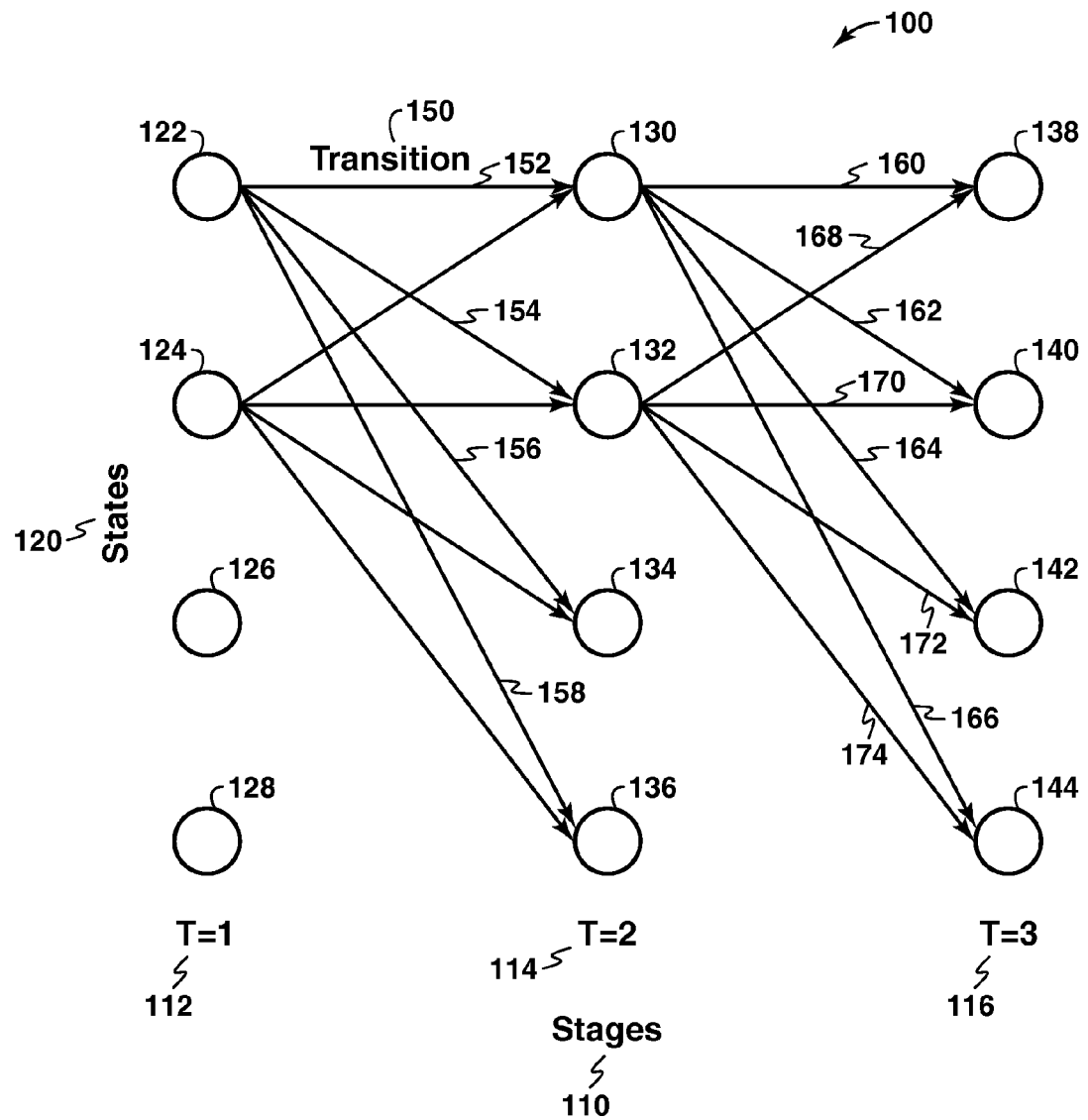
FIG. 1 is an illustration of a Markov decision process-based model representing uncertainty associated with data for a reservoir model resolved in several steps and the resolution of the uncertainty over time in accordance with certain exemplary embodiments of the present invention.

Many aspects of the present invention can be better understood with reference to the above drawings. The elements and features shown in the drawings are not necessarily to scale, emphasis instead being placed upon clearly illustrating principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF THE EXEMPLARY EMBODIMENTS

Exemplary embodiments of the present invention support making decisions regarding reservoir development planning while details of uncertain parameters remain unknown. Uncertain parameters unfold over time and decisions may need to be made at regular intervals while incorporating the available information in the decision process. These uncertainties and its evolution over time can be considered directly within an optimization model that can be a Markov decision process-based model, otherwise known as a stochastic dynamic programming model ("SDP"). In an exemplary embodiment, the Markov decision process-based model systematically addresses all the uncertain data. The uncertainty is represented by transition probabilities that govern transitions between stages, which will be further discussed below. Such a paradigm allows for producing flexible and robust solutions that remain feasible covering the uncertainty space, as well as making the trade-off between optimality and the randomness of uncertainty in the input data to reflect the risk attitude of a decision-maker.

The Markov decision process-based model not only incorporates the uncertainty representation in the optimization model and evaluates solution performance explicitly over all scenarios, it also incorporates the flexibility that the decision-maker has in the real world to adjust decisions based on new information obtained over time. The decision-maker will be able to make corrective decisions/actions based upon this new information. This feature allows for generation of much more flexible and realistic solutions. Additionally, this model easily incorporates black box functions for state equations and allows complex conditional transition probabilities to be used.

In certain exemplary embodiments, Markov decision process-based modeling provides an approach to reservoir development planning and handles uncertainty effectively. One exemplary embodiment of Markov decision process-based modeling takes advantage of the fact that probability distributions governing reservoir development planning data are known or can be estimated. In some embodiments, the Markov decision process-based modeling may be utilized to find a policy that is feasible for all, or nearly all, the possible data instances, as well as maximizes the expectation of some function of the decisions and random variables.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

An exemplary embodiment of the present invention will now be described in detail with reference to FIGS. 1-6. FIG. 1 is an illustration of a Markov decision process-based model representing uncertainty associated with data for a reservoir model resolved in several steps and the resolution of the uncertainty over time in accordance with certain exemplary embodiments of the present invention. The Markov decision process-based model 100 illustrates a model with three stages 110 (112, 114, and 116) and four states 120 (122, 124, 126, and 128) per stage 110. The stages 110 represent the time horizon, the states 120 are used to represent the constraints, the actions (not shown) represent the decision variables, and the transition probabilities 150 are based on the data probability distributions. These transition probabilities represent the uncertainty in the data. Although three stages and four states are illustrated in this Markov decision process-based model, any number of stages and states may be possible without departing from the scope and spirit of the exemplary embodiment.

According to FIG. 1, at stage T=1 112, the system may be in a first state 122, a second state 124, a third state 126, or a fourth state 128. At stage T=2 114, the system may be in a fifth state 130, a sixth state 132, a seventh state 134, or an eight state 136. At stage T=3 116, the system may be in a ninth state 138, a tenth state 140, an eleventh state 142, or a twelfth state 144. FIG. 1 shows the resolution of uncertainty over time when the initial state is at the first state 122.

When the initial state of the system is at stage T=1 112 and the first state 122, the system can transition to the fifth state 130 based upon a first transition probability 152, the sixth state 132 based upon a second transition probability 154, the seventh state 134 based upon a third transition probability 156, or the eighth state 136 based upon a fourth transition probability 158. The transition probabilities 150 are based upon the proposed action to be taken. Additionally, the number of transition probabilities is equal to the number of future states at stage T=2 114. The transition probabilities may range from 0% to 100%. According to some of the embodiments, the transition probabilities are greater than zero, but less than one hundred.

When the state of the system is at stage T=2 114 and the fifth state 130, the system can transition to the ninth state 138 based upon a fifth transition probability 160, the tenth state 140 based upon a sixth transition probability 162, the eleventh state 142 based upon a seventh transition probability 164, or the twelfth state 144 based upon an eighth transition probability 166. The transition probabilities 150 are based upon the proposed action to be taken. Additionally, the number of transition probabilities is equal to the number of future states at stage T=3 116. The transition probabilities may range from 0% to 100%. According to some of the embodiments, the transition probabilities are greater than zero, but less than one hundred.

However, if the system is at stage T=2 114 and the sixth state 132, the system can transition to the ninth state 138 based upon a ninth transition probability 168, the tenth state 140 based upon a tenth transition probability 170, the eleventh state 142 based upon an eleventh transition probability 172, or the twelfth state 144 based upon a twelfth transition probability 174. The transition probabilities 150 are based upon the proposed action to be taken. Additionally, the number of transition probabilities is equal to the number of future states at stage T=3 116. The transition probabilities may range from 0% to 100%. According to some of the embodiments, the transition probabilities are greater than zero, but less than one hundred.

Thus, according to one embodiment, the decision-maker's ultimate reward is to be at stage T=3 116 and the ninth state 138. If the decision-maker is starting at stage T=1 112 and the first state 122, the decision-maker may desire to proceed from the first state 122 at stage T=1 112 to the ninth state 138 at stage T=3 116, via the fifth state 130 at stage T=2 114. The decision-maker believes that certain actions will facilitate that progress based upon the transition probability 150, which contains the uncertainties. However, due to the uncertainties, the decision-maker may instead proceed to the sixth state 132 at stage T=2 114 from the first state 122 at stage T=1 112. At the sixth state 132, stage T=2 114, the decision-maker may undertake corrective actions so that the decision-maker may attempt to proceed to the ninth state 138 at T=3 116. Although two examples have been provided for reaching the ninth state 138 at stage T=3 116, many pathways may be available for reaching the final reward, ninth state 138 at stage T=3 116, without departing from the scope and spirit of the exemplary embodiment. Additionally, although the final reward has been described to be the ninth state 138 at stage T=3 116, the final reward may be any other state at any future stage without departing from the scope and spirit of the exemplary embodiment. Furthermore, although it has been shown that the first state 122 may progress to the ninth state 138, any initial state at stage T=1 112 may progress to any final state at stage T=3 116, based upon the actions taken and the transition probabilities.

The application of a Markov decision process-based model under uncertainty may include long term planning of investment, production, or development, in which fixed decisions occur in stages over time. Therefore, opportunities are created to consider more definite information as time passes. Decisions in the model may also include decisions that correspond to actions that may recover information about the uncertainties. Recourse embedded in the Markov decision process-based model allows for the decision-maker to adjust their decisions, or undertake corrective actions, based on the information obtained. As used herein, the term "recourse" refers to the ability to take corrective action after a random event has taken place. With recourse leading to robust, flexible, higher value decisions and a realistic model of decision-making in the real world, the Markov decision process-based model provides solutions that are more optimal.

Figure 2:
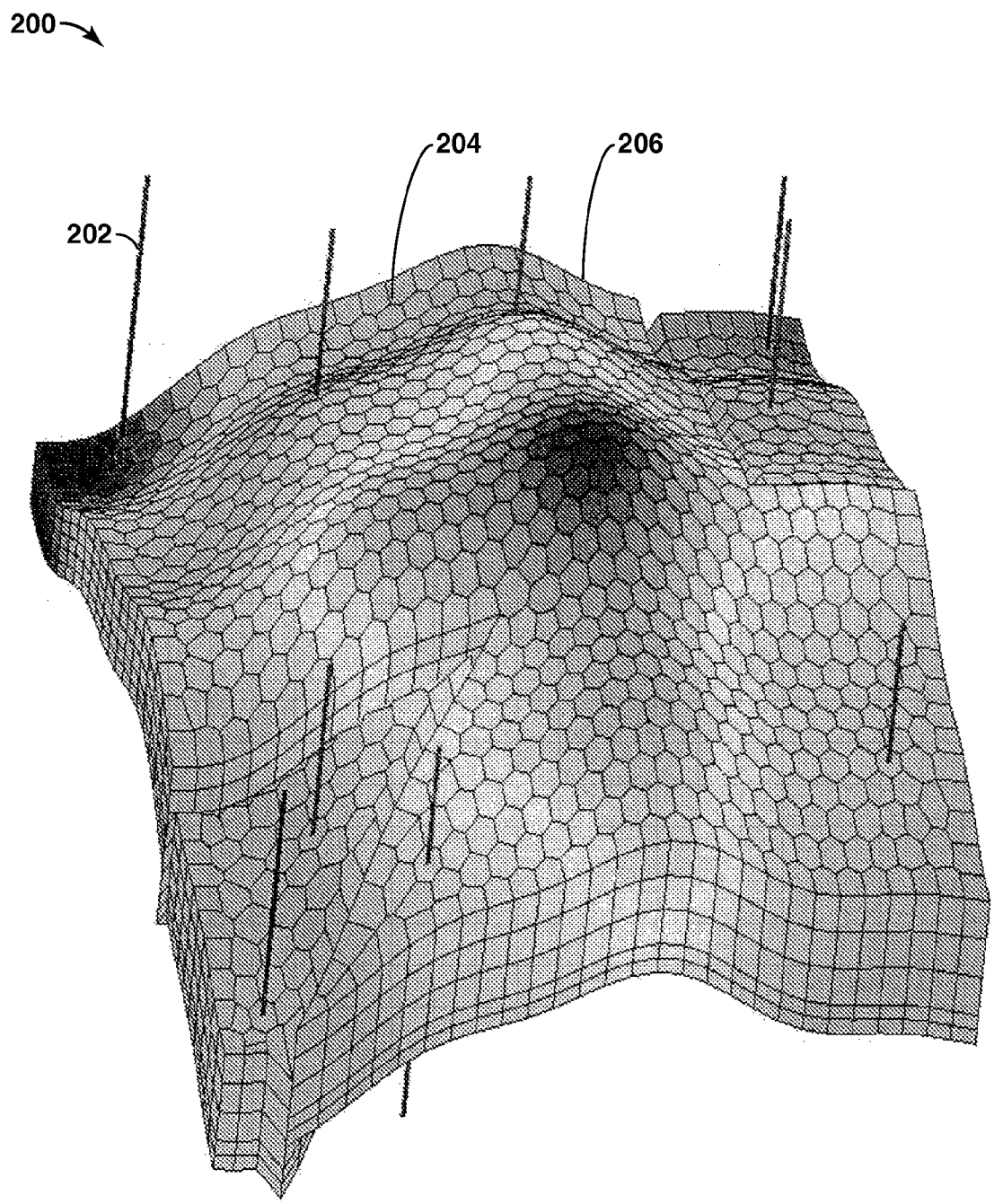
FIG. 2 is an illustration of a three-dimensional reservoir model including a grid mesh that defines a plurality of nodes in accordance with certain exemplary embodiments of the present invention.

FIG. 2 is an illustration of a three-dimensional reservoir model 200 including a grid mesh 206 that defines a plurality of nodes 204 in accordance with certain exemplary embodiments of the present invention. The reservoir model 200 may be used for simulating operation of an oil and/or gas reservoir with one or more vertical wells 202. As shown, the reservoir model 200 may be broken up into a plurality of nodes 204 by a grid mesh 206. The grid mesh 206 represents a geological formation in cell format to support computer-based processing of reservoir and geological information according to the grid mesh 206. The nodes 204 of the reservoir model 200 may be of non-uniform size. This three-dimensional reservoir model 200 may provide additional data to be used in conjunction with a reservoir simulator.

Figure 3:
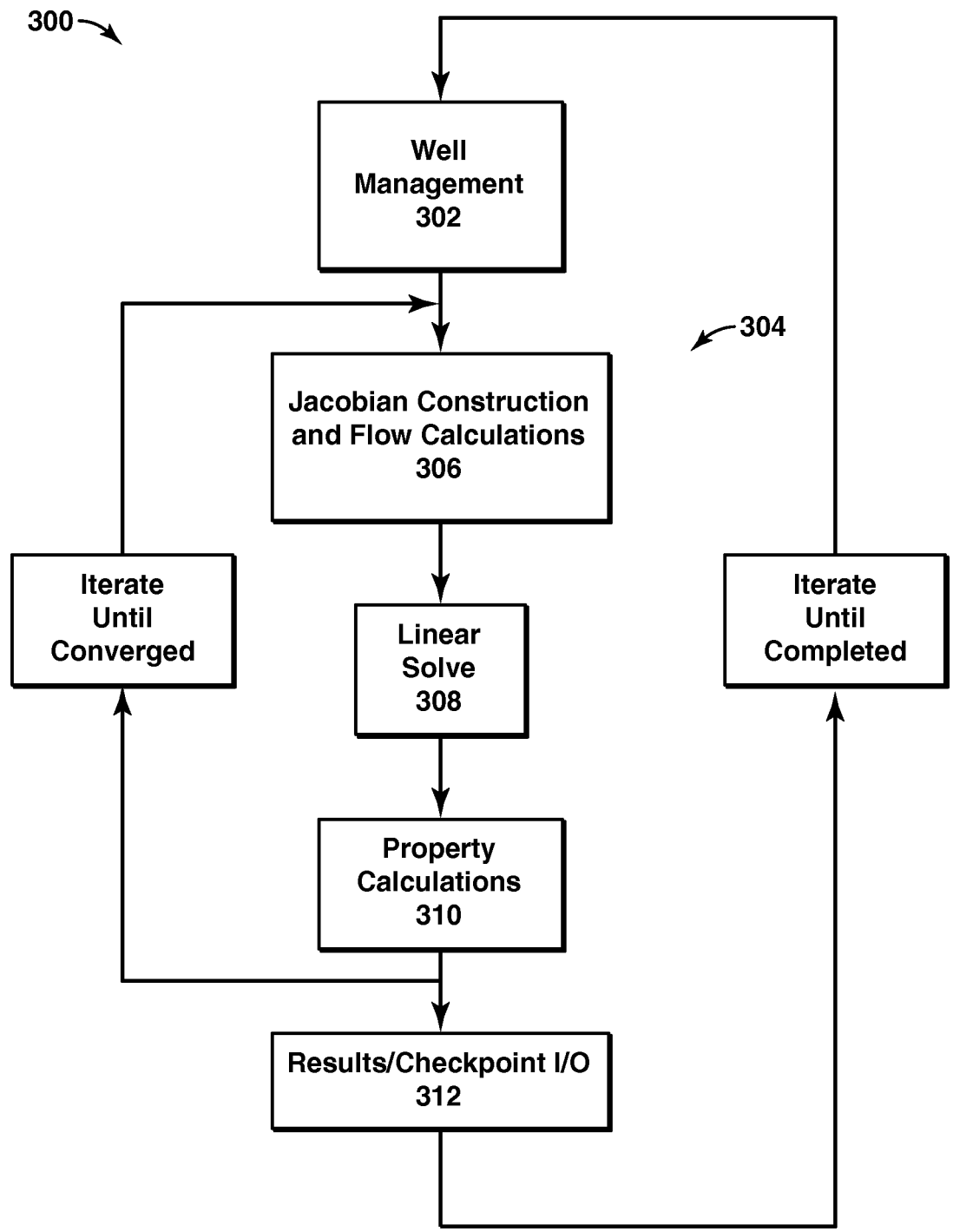
FIG. 3 is a flowchart illustration of a reservoir simulator for simulating the operation of the reservoir model of FIG. 2 in accordance with certain exemplary embodiments of the present invention.

FIG. 3 is a flowchart illustration of a reservoir simulator 300 for simulating the operation of the reservoir model 200 of FIG. 2 in accordance with certain exemplary embodiments of the present invention. In an exemplary embodiment, the simulator 300 comprises a set of instructions executing on a computer system. That is, the simulator 300 comprises one or more software programs running on one or more computers. Additionally, the computer may have one or more processors performing the simulation.

Referring to FIG. 2 and FIG. 3, the reservoir simulator 300 simulates the reservoir model's operation in which well management 302 is performed for the well 202 and surface facility network of the reservoir model 200. The well management 302 is performed over all wells 202 in the reservoir model 200 and includes an iterative process 304 in which a Jacobian construction and flow calculation 306 is performed, followed by a linear solve 308 and one or more property calculations 310. The linear solve 308 and/or the one or more property calculations 310 are performed over large arrays of data that represent properties such as, for example, pressure and composition at mesh points in the grid mesh 206.

Upon the completion and convergence of the iterative process 304 for the well 202 in the reservoir model 200, the data for the well 202 is then generated in a results/checkpoint I/O 312. Upon completion of the well management 302 for the well 202, the well management 302 may be performed for the remaining wells 202 of the entire reservoir model 200, wherein the results of each well 202 are generated in the results/checkpoint I/O 312.

The reservoir simulator 300 may be implemented, for example, using one or more general purpose computers, special purpose computers, analog processors, digital processors, central processing units, and/or distributed computing systems. That is, the reservoir simulator 300 can comprise computer executable instructions or code.

The output of the reservoir simulator 300 can comprise a result displayed on a graphical user interface (GUI), a data file, data on a medium such as an optical or magnetic disk, a paper report, or signals transmitted to another computer or another software routine (not an exhaustive list).

The reservoir model 200 and reservoir simulator 300 may be used to simulate the operation of the reservoir to thereby permit modeling of fluids, energy, and/or gases flowing in the hydrocarbon reservoirs, wells, and related surface facilities. Reservoir simulation 300 is one part of reservoir optimization which also includes constructing the data to accurately represent the reservoir. An exemplary simulation goal comprises understanding formation flow patterns in order to optimize some strategy for producing hydrocarbons from some set of wells 202 and surface facilities. The simulation is usually part of a time-consuming, iterative process to reduce uncertainty about a particular reservoir model description while optimizing a production strategy. Reservoir simulation, for example, is one kind of computational fluid dynamics simulation.

The reservoir model 200 and the reservoir simulator 300 may further be used to optimize the design and operation of the corresponding reservoir, wells, and related surface facilities.

Figure 4:
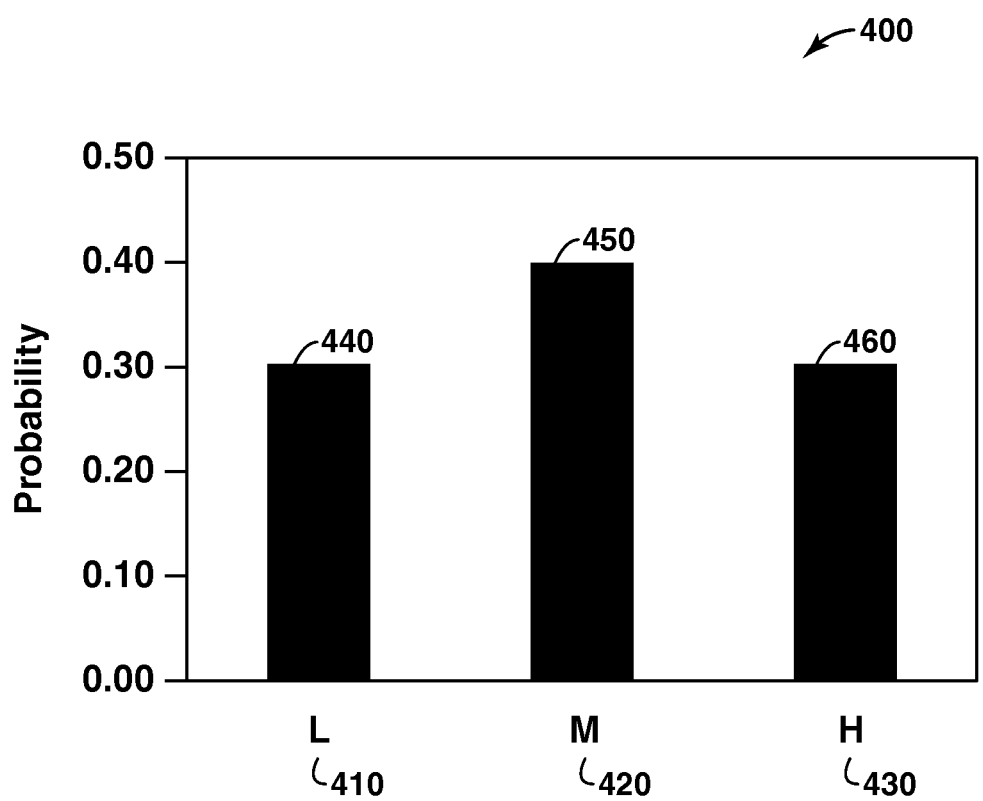
FIG. 4 is a graph representing a discrete probability distribution for the uncertain production profile for a reservoir field in accordance with an exemplary embodiment.
Figure 5:
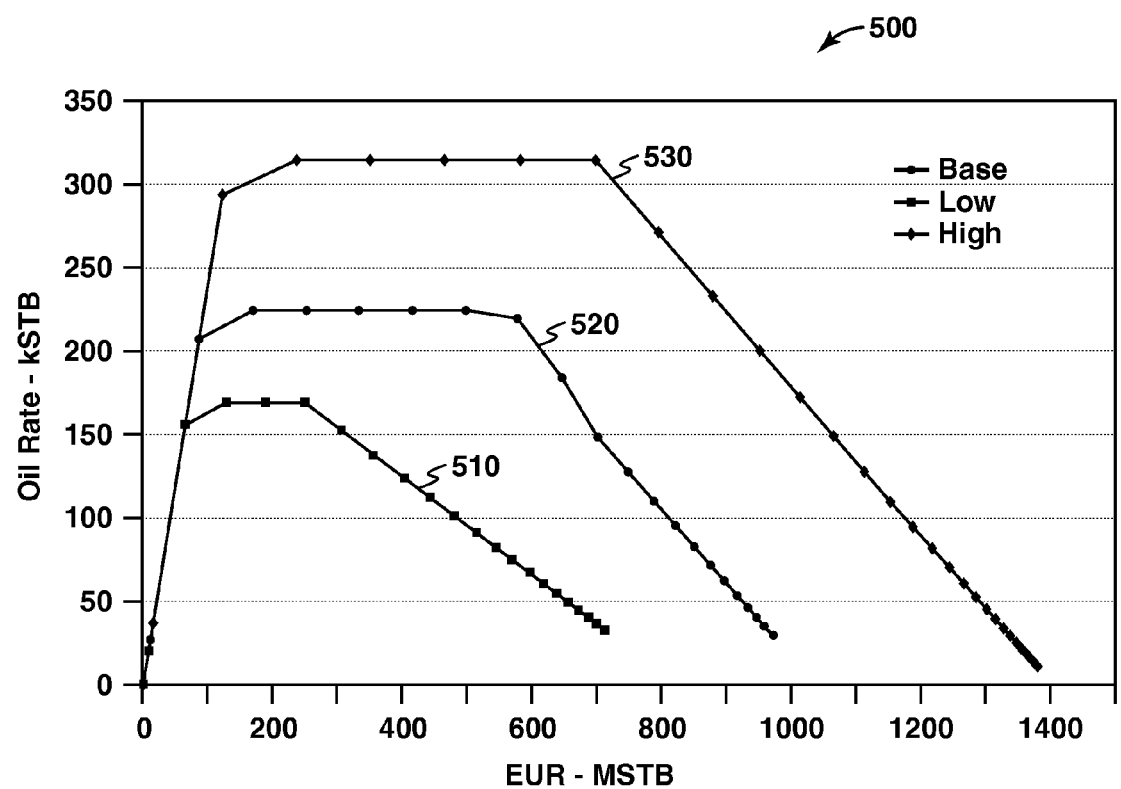
FIG. 5 is a graph representing the production profiles for three possible scenarios for a reservoir in accordance with an exemplary embodiment.

Referring to FIGS. 4 and 5, FIG. 4 is a graph representing a discrete probability distribution for the uncertain production profile for a reservoir field in accordance with an exemplary embodiment and FIG. 5 is a graph representing the production profiles for three possible scenarios for a reservoir in accordance with an exemplary embodiment. In the event the probability distributions are continuous, some form of sampling techniques, including, but not limited to, sample average approximation, will be used to discretize the uncertainty for the model. According to the uncertain production profile chart 400 in FIG. 4, the probability of a low scenario 410 is 0.30, or 30 percent, 440. Additionally, the probability of a medium, or base, scenario 420 is 0.40, or 40 percent, 450. Furthermore, the probability of a high scenario 430 is 0.30, or 30 percent, 460. FIG. 5 illustrates the three possible oil production scenarios, a low scenario oil rate 510, a base scenario oil rate 520, and a high scenario oil rate 530, for a reservoir. The data shown in the production profile chart 500 is generated from using any of the reservoir simulators.

Figure 6:
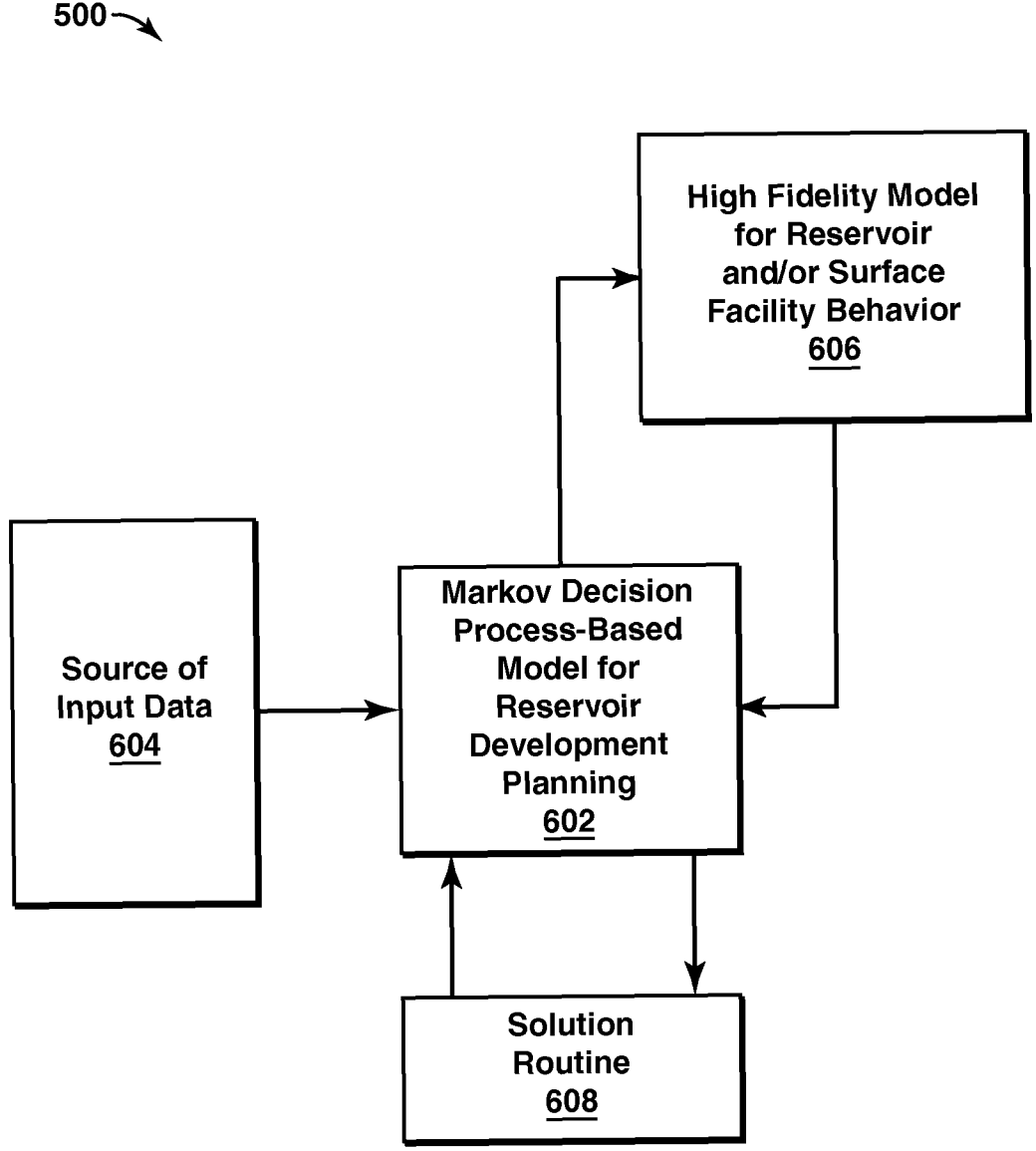
FIG. 6 is a schematic illustration of a Markov decision process-based reservoir development planning system in accordance with certain exemplary embodiments of the present invention.

FIG. 6 is a schematic illustration of a Markov decision process-based reservoir development planning system 600 in accordance with certain exemplary embodiments of the present invention. In an exemplary embodiment, the reservoir development planning system 600 is a computer program, a software-based engine, or a computing module. Moreover, each illustrated block in the diagram of FIG. 6 can comprise a computer program, a software-based engine, or a computing module. Thus, the Markov decision process-based reservoir development planning system 600 may be implemented, for example, using one or more general purpose computers, special purpose computers, analog processors, digital processors, central processing units, and/or distributed computing systems.

The Markov decision process-based reservoir development planning system 600 includes one or more Markov decision process-based models for reservoir development planning 602. The Markov decision process-based model for reservoir development planning 602 is a Markov decision process-based model for optimizing the development plan given some target objective and subject to the constraints of the system.

Additionally, the Markov decision process-based reservoir development planning system 600 may further include at least one source of input data 604, a high fidelity model for reservoir and/or surface facility behavior 606 and a solution routine 608. The high fidelity model for reservoir and/or surface facility behavior 606 is a high fidelity model, or reservoir simulation model, or a collection of reservoir simulation models where each element in the collection represents one possible realization of the uncertainty space. The high fidelity model could also be just one reservoir simulation model that encapsulates the uncertainty. The high fidelity model is used to update and adjust the Markov decision process-based model for reservoir development planning 602 in subsequent iterations. Such updates and adjustments provide refinement as the Markov decision process-based model for reservoir development planning 602 may contain an approximation of the high fidelity model for reservoir and/or surface facility behavior 606 within its system of constraint equations. A low fidelity model, which is included within the Markov decision process-based model for reservoir development planning 602, provides this approximation of the high fidelity model for reservoir and/or surface facility behavior 606. Similar to the case of the high fidelity model, the low fidelity model could be a collection of individual low fidelity models, such that each element is a simplification of an element in the collection of high fidelity models. Alternatively, the low fidelity model could exist as an individual model that encapsulates the uncertainty. Although two forms have been enumerated in the exemplary embodiment for each of the high fidelity model and the low fidelity model, additional forms and combinations are contemplated for each of these models without departing from the scope and spirit of the exemplary embodiment.

The Markov decision process-based model for reservoir development planning 602 may receive input data from a source of input data 604. The input data can comprise data entries in one or more spreadsheets, one or more databases, information fed over a computer network or the Internet, manual entries, user input from a GUI, etc.

After processing the input data, the Markov decision process-based model for reservoir development planning 602 may provide output to a high fidelity model for reservoir and/or surface facility behavior 606 of the reservoir under consideration. The high fidelity model for reservoir and/or surface facility behavior 606 may in turn provide its output data back to the Markov decision process-based model for reservoir development planning 602. Finally, the Markov decision process-based model for reservoir development planning 602 may interface with the solution routine 608.

The present exemplary embodiment provides a Markov decision process-based reservoir development planning system 600 in which the inherent uncertainty in the data associated with a reservoir is incorporated directly into the Markov decision process-based model for reservoir development planning 602. By incorporating the uncertainty in the data into the Markov decision process-based model for reservoir development planning 602, tradeoffs associated with decisions across various realizations of the uncertainty are captured and hence better information is available when making decisions regarding petroleum and/or natural gas reservoir development planning.

Generally, the Markov decision process-based model may be formulated, solved analytically or numerically, and analyzed in order to provide useful information to the decision-maker. One of the aims of the Markov decision process-based model is to minimize the expected cost or maximize the expected revenue over the entire planning horizon, wherein uncertainty is incorporated within the model. The Markov decision process-based model, or stochastic dynamic programming, is an extension of dynamic programming wherein the uncertainty is incorporated into the optimization model. The Markov decision process-based model is similar to the dynamic programming model except the deterministic transition function is replaced by a transition probability matrix which represents the uncertainty in the system. Thus, for a given state and action in stage n, the state of the system in stage n+1 is modeled probabilistically. The Markov decision process-based model can be represented as (S, A, P, R) where S is the state space, A(s) is the set of actions that can be taken in state s, P(s,s',a) is the probability that the system will transition from state s to state s' given action a and R(s,a) is the reward for choosing action a in state s. A generic formulation for a Markov decision process-based model is shown below:

6. $J_n^*(s) = {}_a\min_{s'}\left[c(s, a) + \Sigma P_a(s, s')J_{n+1}^*(s')\right]$ for $n = 1, 2, 3, \ldots N$
   a.

7. Where

8. $J_n^*(s)$ = optimal cost-to-go function in stage $n$ given state $s$

9. $c(s, a)$ = cost of choosing action $a$ in state $s$

10. $P_a(s, s')$ = probability that system will transition from state $s$ in stage $n$ to state $s'$ in state $n + 1$ given action $a$.

A major strength of Markov decision process-based model is that unlike most other approaches, this approach provides solutions that allow the decision-maker to take corrective actions as uncertainty unfolds over time.

In an exemplary embodiment, the Markov decision process-based reservoir development planning system 600 provides a decision support tool to optimize a risk averse, risk neutral, or risk seeking measure of the objective function (e.g., net present value—NPV) satisfying all business problem constraints.

In an exemplary embodiment, the Markov decision process-based model for reservoir development planning 602 may be a data independent mathematical abstraction of the reservoir model 200 (FIG. 2). The source of input data 604 may provide reservoir data which may, for example, be stored and retrieved from spreadsheets, databases, manual entry, or otherwise. The high fidelity model for reservoir and/or surface facility behavior 606 may include one or more reservoir or surface facility simulators such as, for example, the reservoir simulator 300 can comprise or be based upon software based tools, programs, or capabilities; such as those marketed by: (1) Schlumberger Technology Corporation under the registered trademark "ECLIPSE", (2) Landmark Graphics Corporation under the registered trademark "VIP", or (3) Landmark Graphics Corporation under the registered trademark "NEXUS". Also, the solution routine 608 may comprise one or more routines, methods, processes, or algorithms for solving the Markov decision process-based model for reservoir development planning 602.

In an exemplary embodiment, the design and operation of the Markov decision process-based model for reservoir development planning 602 and the solution routine 608 may be combined in whole or in part. Additionally, the design and operation of the Markov decision process-based reservoir development planning system 600 may be implemented, for example, using one or more general purpose programmable computers which may, or may not, be distributed within or between one or more communication networks.

Figure 7:
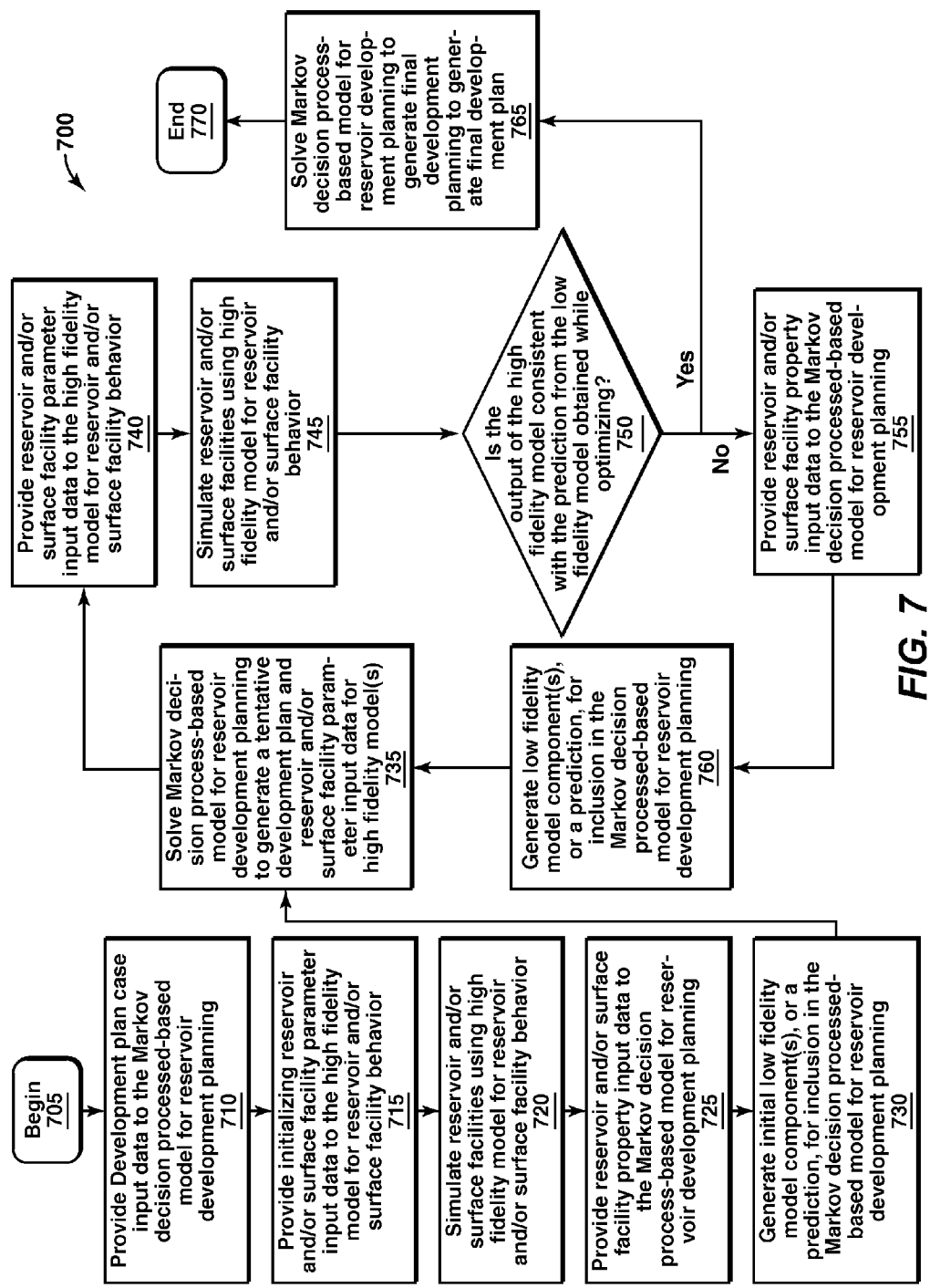
FIG. 7 is a flowchart illustration of a method for operating the Markov decision process-based reservoir development planning system of FIG. 6 in accordance with certain exemplary embodiments of the present invention.

FIG. 7 is a flowchart illustration of a method 700 for operating the Markov decision process-based reservoir development planning system of FIG. 6 in accordance with an exemplary embodiment.

Certain steps in the methods and processes described herein (with reference to FIG. 7 as well as the other figures) must naturally precede others for the present invention to function as described. However, the present invention is not limited to the order of the steps described if such order or sequence does not adversely alter the functionality of the present invention. That is, it is recognized that some steps may be performed before or after other steps or in parallel with other steps without departing from the scope and spirit of the present invention.

The present invention can include multiple processes that can be implemented with computer and/or manual operation. The present invention can comprise one or more computer programs that embody certain functions described herein and illustrated in the examples, diagrams, figures, and flowcharts. However, it should be apparent that there could be many different ways of implementing aspects of the present invention with computer programming, manually, non-computer-based machines, or in a combination of computer and manual implementation. The invention should not be construed as limited to any one set of computer program instructions. Further, a programmer with ordinary skill would be able to write such computer programs without difficulty or undue experimentation based on the disclosure and teaching presented herein.

Therefore, disclosure of a particular set of program code instructions is not considered necessary for an adequate understanding of how to make and use the present invention. The inventive functionality of any programming aspects of the present invention will be explained in further detail in the following description in conjunction with the figures illustrating the functions and program flow and processes.

Referring to FIG. 7, the method of operation 700, which will be discussed with exemplary reference to FIGS. 1, 2, 3, 4, 5, and 6, begins at step 705 and proceeds to step 710. At step 710 the development plan case input data is provided to the Markov decision process-based model for reservoir development planning 602. The input data may be provided from a combination of manual data entry, spreadsheets, and databases and may include, but is not limited to, specifications of uncertain parameters (e.g. transition probabilities, mode and time of resolution), decision variables (e.g. time when they will be implemented), risk attitude, objective function, etc. These input data may form a data instance that is used to populate one or more mathematical models within the Markov decision process-based model for reservoir development planning 602.

At step 715, the initializing reservoir and/or surface facility parameter input data is provided to the high fidelity model for reservoir and/or surface facility behavior 606. At step 720, the high fidelity model for reservoir and/or surface facility behavior 606 simulates the reservoir and/or surface facilities. This high fidelity model for reservoir and/or surface facility behavior 606 may include one or more high fidelity models for reservoir and surface facility behavior such as, for example, reservoir and facility simulators as discussed above. Additionally, upon performing the simulation, data relating to the operation of the reservoir and surface facilities are obtained, wherein the data includes, but is not limited to, production estimates, structure, flow properties, etc.

At step 725, the simulation results of the reservoir and/or surface facility property are provided as reservoir and/or surface facility property input data, which may also be referred to as first high fidelity output data, to the Markov decision process-based model for reservoir development planning.

At step 730, the initial low fidelity model components are generated for inclusion in the Markov decision process-based model for reservoir development planning 602. The initial low fidelity model components are a prediction for the reservoir and/or surface facility behavior. This prediction is generated from using the input data and the first high fidelity output data. The Markov decision process-based model for reservoir development planning 602 includes a low fidelity model that is computationally efficient and provides an approximation of the reservoir and surface facility behavior. In other words, as compared to the high fidelity model, the low fidelity model provides less computational precision to produce relatively rough results and thus executes much faster on a typical computing system. The low fidelity model may be generated from a portion of the software code used in the high fidelity model for reservoir and/or surface facility behavior 606. For example, the software of high fidelity model can be tuned so as to run fewer iterations. The high fidelity model can be adapted or configured to provide the low fidelity model via running two dimensional cross sections, via reducing the number of parameter inputs, via specifying larger cell sizes, etc.

Upon completion of steps 705 to 730, the Markov decision process-based model for reservoir development planning 602 is solved at step 735, utilizing the input data and the low fidelity model for reservoir and/or surface facility behavior. The Markov decision process-based model for reservoir development planning 602 can be solved using one or more fit-for-purpose solution routines that may be provided in the one or more of the Markov decision process-based model for reservoir development planning 602 and the solution routine 608. The fit-for-purpose solution routines may include a combination of commercial or openly available mathematical programming solver routines and specially designed model-specific techniques. The solving of the Markov decision process-based model for reservoir development planning 602 generates a reservoir model solution, wherein a tentative development plan and reservoir and/or surface facility parameter input data, which may also be referred to as reservoir development planning output data, for the high fidelity model for reservoir and/or surface facility behavior 606 may be generated based on this reservoir model solution.

At step 740, the reservoir and/or surface facility parameter input data, generated by the solving of the Markov decision process-based model for reservoir development planning 602, is provided to the high fidelity model for reservoir and/or surface facility behavior 606.

At step 745, the high fidelity model for reservoir and/or surface facility behavior 606 again simulates the reservoir and/or surface facilities. This simulation generates a corresponding high fidelity output data, which may also be referred to as the reservoir and/or surface facility property input data.

At step 750, a determination is made as to whether the output of the high fidelity model is substantially consistent with the prediction from the low fidelity model. If the components are not substantially consistent, the reservoir and/or surface facility property input data is again provided to the Markov decision process-based model for reservoir development planning 602 at step 755. At step 760, the low fidelity model components are again generated for inclusion into the Markov decision process-based model for reservoir development planning 602.

At step 735, the Markov decision process-based model for reservoir development planning 602 is again solved. This process continues to iterate until the output of the high fidelity model is substantially consistent with the prediction from the low fidelity model at step 750. For example, when the results of the low fidelity model and the high fidelity model converge, step 750 can make a determination that a sufficient level of processing has been completed. At that point, step 750 deems the iterating complete.

Once the prediction from the low fidelity model is consistent with the output of the high fidelity model for reservoir and/or surface facility behavior 606, the Markov decision process-based model for reservoir development planning 602 is again solved to generate an output which may include a final development plan at step 765. The output may be used to generate reports, calculations, tables, figures, charts, etc. for the analysis of development planning or reservoir management under data uncertainty. Moreover exemplary embodiments of the output comprise, a result displayed on a graphical user interface (GUI), a data file, data on a medium such as an optical or magnetic disk, a paper report, or signals transmitted to another computer or another software routine, or some other tangible output to name a few examples.

According to some embodiments, multiple cases may be tested and optimized so that their results may be compared side-by-side as part of the process. The method of operation 700 then ends at step 770. Although the method of operation 700 has been illustrated in steps, some of the steps may be performed in a different order without departing from the scope and spirit of the exemplary embodiment.

In various exemplary embodiments, the method 700 can be implemented using a mathematical programming language or system such as, for example, AIMMS, GAMS, AMPL, OPL, Mosel or using a computer programming language such as, for example, C++ or Java, or some combination of both. The fit-for-purpose solution routines may be developed in either mathematical programming languages or directly with a computer programming language or with support of commercially available software tools. For example, commercial and open source versions of mathematical programming languages and computer programming code compilers are generally available.

It is understood that variations may be made in the foregoing without departing from the scope and spirit of the invention. For example, the teachings of the present illustrative embodiments may be used to enhance the computational efficiency of other types of n-dimensional computer models.

Although illustrative embodiments of the present invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope and spirit of the invention.

What is claimed is:

1. A method for reservoir development planning, comprising the steps of:
   receiving data relevant to reservoir development;
   processing the received data by using a computer-implemented Markov decision process-based model,
   wherein the using the computer-implemented Markov decision process-based model includes
   defining a plurality of stages, each stage representing a discrete step in time;
   defining a plurality of states in each stage, each state representing a potential state of the reservoir development plan, and
   determining a future state by using a probability that the reservoir development transitions from a current state in a current stage to the future state in a subsequent stage, the probability being determined by the current state of the reservoir development and an action to be taken in the current stage that causes the transition to the subsequent stage; and generating a reservoir development plan in response to processing the received data via the computer-implemented Markov decision process-based model.

2. The method of claim 1, wherein the generating step comprises generating the reservoir development plan according to an uncertainty space associated with the received data.

3. The method of claim 1, wherein the computer-implemented Markov decision process-based model comprises optimizing at least some aspect of the reservoir development plan based on the received data and an uncertainty space.

4. The method of claim 1, wherein the step of receiving data comprises receiving known data parameters and uncertain data parameters, and
wherein processing the received data via the computer-implemented Markov decision process-based model comprises processing the data with a Markov decision process-based model that incorporates the uncertain data parameters.

5. The method of claim 1, wherein an uncertainty space is associated with the received data, and
wherein processing the received data via the computer-implemented Markov decision process-based model comprises considering the uncertainty space in entirety.

6. The method of claim 1, wherein a decision-maker is allowed to undertake one or more corrective decisions at each of the plurality of stages within the Markov decision process-based model.

7. A method for reservoir development planning, comprising the steps of:
receiving data relevant to reservoir development planning, wherein uncertainty is associated with the data;
processing the received data by using a computer-implemented Markov decision process-based model,
wherein the using the computer-implemented Markov decision process-based model includes
defining a plurality of stages, each stage representing a discrete step in time;
defining a plurality of states in each stage, each state representing a potential state of the reservoir development plan, and
determining a future state by using a probability that the reservoir development transitions from a current state in a current stage to the future state in a subsequent stage, the probability being determined by the current state of the reservoir development and an action to be taken in the current stage that causes the transition to the subsequent stage;
producing at least some portion of a reservoir development plan in response to processing the received data with the computer-based optimization model that incorporates the uncertainty; and
undertaking one or more corrective decisions as the uncertainty unfolds over time.

8. The method of claim 7, wherein incorporating the uncertainty in the Markov decision process-based model comprises capturing tradeoffs across a plurality of realizations of the uncertainty.

9. The method of claim 7, wherein the step of producing at least some portion of the reservoir development plan in response to processing the received data with the computer-based optimization model that incorporates the uncertainty comprises
achieving feasibility of an optimization problem across an entire uncertainty space.

10. The method of claim 7, wherein the step of producing at least some portion of the reservoir development plan in response to processing the received data with the computer-based optimization model that incorporates the uncertainty comprises
systemically processing uncertain data within the Markov decision process-based model.

11. A method for decision support regarding development of petroleum resources, comprising the steps of:
receiving a plurality of data elements regarding a decision about developing a petroleum reservoir, wherein a respective characterization of uncertainty is associated with each of the data elements; and
outputting a recommendation for the decision in response to processing each of the data elements and each of the respective characterizations of uncertainty by using a computer-implemented Markov decision process-based model,
wherein the using the computer-implemented Markov decision process-based model includes:
defining a plurality of stages, each stage representing a discrete step in time;
defining a plurality of states in each stage, each state representing a potential state of the reservoir development plan, and
determining a future state by using a probability that the reservoir development transitions from a current state in a current stage to the future state in a subsequent stage, the probability being determined by the current state of the reservoir development and an action to be taken in the current stage that causes the transition to the subsequent stage.

12. The method of claim 11, wherein the Markov decision process-based model incorporates each of the respective characterizations of uncertainty.

13. The method of claim 11, wherein processing each of the data elements and each of the respective characterizations of uncertainty with the computer-based Markov decision process-based model comprises covering an uncertainty space.

14. A computer-based method of optimizing development planning for a reservoir, comprising:
providing input data that comprises uncertainty;
generating a first simulation of the reservoir using a high fidelity model for reservoir or surface facility behavior utilizing the input data, wherein the first simulation generates first high fidelity output data;
generating a low fidelity model for reservoir or surface facility behavior using the input data and the first high fidelity output data, wherein the low fidelity model generates a prediction;
optimizing a reservoir development planning model utilizing the input data and the low fidelity model for reservoir or surface facility behavior, wherein the reservoir development planning model generates reservoir development planning output data, wherein the optimizing the reservoir development planning model comprises using a computer-implemented Markov decision process-based model, and the using the computer-implemented Markov decision process-based model includes:
defining a plurality of stages, each stage representing a discrete step in time;
defining a plurality of states in each stage, each state representing a potential state of the reservoir development plan, and
determining a future state by using a probability that the reservoir development transitions from a current state in a current stage to the future state in a subsequent stage, the probability being determined by the current state of the reservoir development and an action to be taken in the current stage that causes the transition to the subsequent stage;

performing a second simulation of the reservoir using the high fidelity model for reservoir or surface facility behavior utilizing the input data and the reservoir development planning output data, wherein the second simulation generates second high fidelity output data;

comparing the second high fidelity output data with the prediction of the low fidelity model;

repeating the steps comprising generating a low fidelity model for reservoir or surface facility behavior, optimizing a reservoir development planning model, performing a second simulation of the reservoir using the high fidelity model for reservoir or surface facility behavior, and comparing the second high fidelity output data with the prediction of the low fidelity model until the second high fidelity output data is substantially consistent with the prediction of the low fidelity model.

15. The method of claim 14, further comprising:
generating a development plan in response to the second high fidelity output data being substantially consistent with the prediction of the low fidelity model.

16. The method of claim 14, wherein a solution routine, interfacing with the Markov decision process-based model, assists the Markov decision process-based model to optimize development planning for the reservoir.

17. The method of claim 14, wherein the Markov decision process-based model comprises a solution routine for assisting with optimizing development planning for the reservoir.

18. A method of producing hydrocarbons from a subterranean reservoir, comprising:
generating a reservoir development planning system based on input data;
optimizing the reservoir development planning system according to an uncertainty space, wherein the reservoir development planning system is optimized using a computer-implemented Markov decision process-based model,
wherein the using the computer-implemented Markov decision process-based model includes:
defining a plurality of stages, each stage representing a discrete step in time;
defining a plurality of states in each stage, each state representing a potential state of the reservoir development plan, and
determining a future state by using a probability that the reservoir development transitions from a current state in a current stage to the future state in a subsequent stage, the probability being determined by the current state of the reservoir development and an action to be taken in the current stage that causes the transition to the subsequent stage; and
producing hydrocarbons from the reservoir according to output from the optimized reservoir development planning system.

19. The method of claim 18, wherein the input data comprises deterministic components and nondeterministic components, and
wherein the step of optimizing the reservoir development planning system according to the uncertainty space comprises
considering each of the nondeterministic components with the Markov decision process-based model.

20. The method of claim 18, wherein the Markov decision process-based model incorporates uncertainty of the input data.

21. The method of claim 18, wherein the uncertainty space specifies inherent uncertainty of the input data.

22. The method of claim 18, wherein the reservoir development planning system comprises:
a Markov decision process-based model comprising a low fidelity reservoir model; and
a high fidelity reservoir model,
wherein the high fidelity model accepts one or more parameter input data from the Markov decision process-based model and provides one or more reservoir or surface facility property input data to the Markov decision process-based model.

23. The method of claim 18, wherein optimizing the reservoir development planning system comprises:
simulating operation of the reservoir using a high fidelity model; and
simulating operation of the reservoir using a low fidelity model.

24. The method of claim 1, wherein the probability includes a plurality of transition probabilities for transitioning from the current state in the current stage to possible future states in the subsequent stage.

* * * * *